United States Patent Office 3,281,229
Patented Oct. 25, 1966

3,281,229
THERMALLY COMPENSATED BED FOR
SUPPORTING GLASS SHEETS
Harold A. McMaster, Woodville, Ohio, assignor to Permaglass Inc., Woodville, Ohio, a corporation of Ohio
Filed Dec. 5, 1963, Ser. No. 328,393
13 Claims. (Cl. 65—182)

This invention relates to heating apparatus and more particularly to improve support means for furnaces and furnace elements of the type disclosed in United States patent application Serial No. 326,713 filed November 29, 1963 in the name of Harold A. McMaster and Norman C. Nitschke, and assigned to the assignee of the present invention.

In the aforesaid United States patent application there is disclosed and claimed an improved method and apparatus for manufacturing tempered glass sheets on a continuous basis. In accordance with that invention, the glass sheets to be tempered are moved along an elongate perforated bed which extends through a heating furnace and then through a cooling blasthead, the surface of the bed within the furnace being shaped to provide the shape desired of the glass sheets. The glass sheets are floated on the bed portion within the furnace by hot gases emitted from the perforations therein, the gas temperature being at or above the deformation temperature of the glass. Hence, by the time the glass sheets leave the furnace they have been heated by the hot gases to deformation temperature such that they conform to the contour of the bed. The hot glass sheets then float through the blasthead where they are cooled by and supported by room temperature air emitted from that portion of the bed within the blasthead.

An important feature of such apparatus is that the support bed is formed of a high heat resistant non-metallic material with an extremely low coefficient of thermal expansion, specifically, fused quartz. Such apparatus can be built at relatively low cost, is extremely durable and efficient, and obviates distortion problems. However, the low thermal expansion of the bed presents a problem in that the bed must be housed within a furnace which, as a practical matter, must be formed of higher thermal expansion materials, i.e. metal. This leads to undesirable stresses, sufficient to cause bed or furnace distortion or fracture, when the furnace is heated to operating temperature.

It is a principal object of the present invention to solve the aforesaid problem. More specifically, the invention has as one of its objects the provision of apparatus of the type described wherein the low thermal expansion bed is supported in such manner as to substantially eliminate any problems normally attendant to the housing of a low thermal expansion structure within one of high thermal expansion. Briefly, this is accomplished in accordance with the invention by supporting the bed on spaced posts which are independent of the furnace walls and which are secured to a structure extending longitudinally of the furnace in spaced relationship thereto and having a thermal expansion substantially equal to that of the bed it supports when the bed temperature is raised from room to operating temperature. In the preferred embodiment, the longitudinally extending structure is of steel and hence has a relatively high coefficient of thermal expansion, but is positioned to remain at relatively low temperature even when the furnace is at operating temperature such that its thermal expansion is very low. The structure is formed in longitudinally extending sections with adjacent ends of the sections disposed in end to end relation with each other and with each such section supporting a section of the ceramic bed. In effect, then the furnace can expand and contract independently of the bed and its support structure, the bed, and its support having about the same amount of expansion, which is quite small, as the furnace is heated to its operating temperature.

These along with other objects, features, and advantages of the invention will become more apparent from the following detailed description of a preferred embodiment thereof made with reference to the drawings in which.

Figure 1:
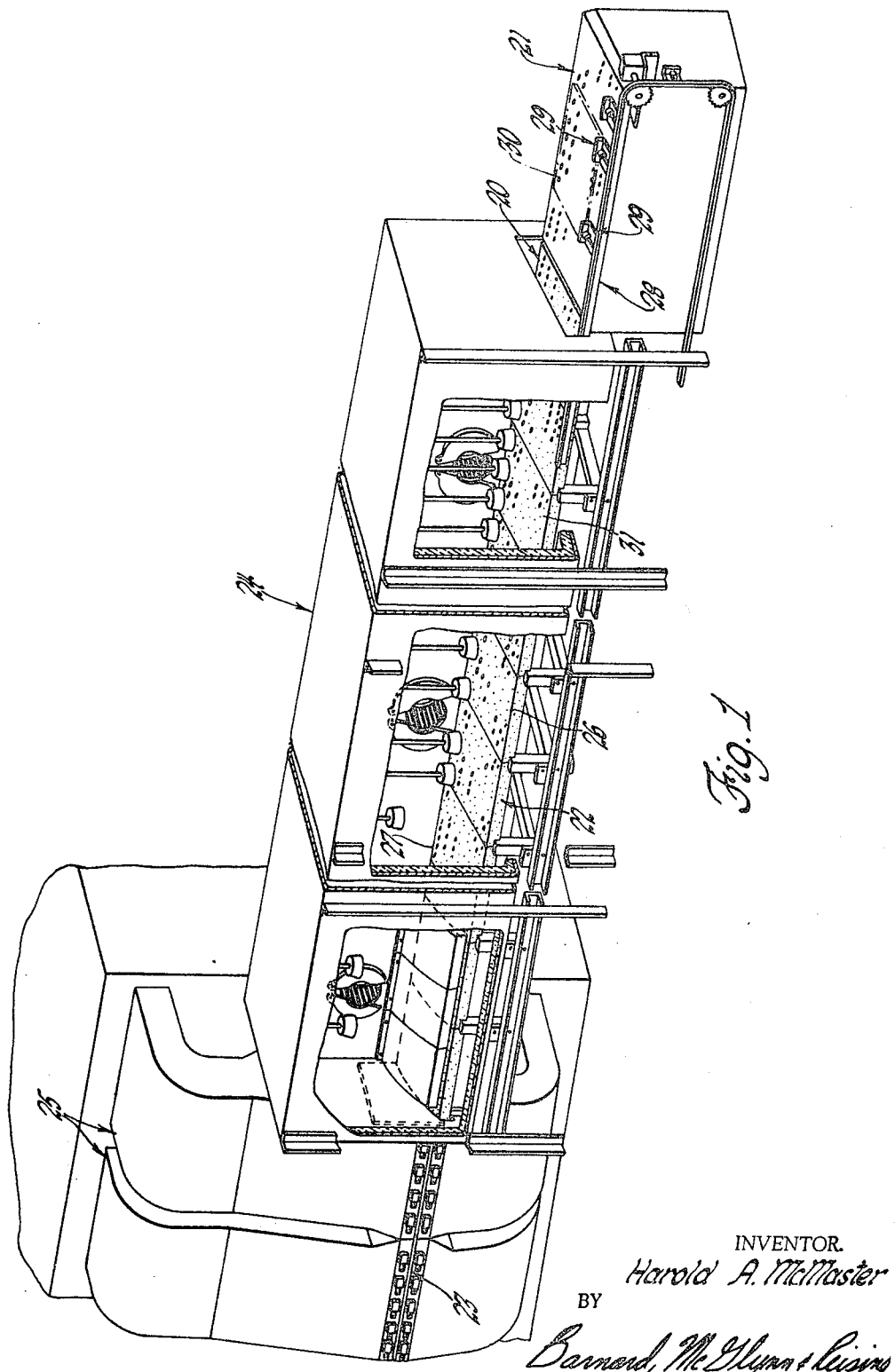
FIGURE 1 is a perspective view, with parts broken away and partially schematic, of the preferred apparatus and illustrates the bed configuration into and through the heating furnace wherein the glass sheets are curved, and into and through blasthead wherein the curved glass sheets are tempered.

Referring now to FIGURE 1, the apparatus shown comprises an elongate perforated bed, illustrated generally by the numeral 20, which, in the actual embodiment herein shown, is about 180 feet long and is composed of three main sections. These sections include a loading section 21, a heating and bending section 22, and a tempering section 23. The heating and bending section 22 is within and constitutes the floor of an elongate furnace structure, illustrated generally by the numeral 24, and tempering section 23 extends through a cooling blasthead, illustrated generally by the numeral 25. The bed is flat throughout section 21 and most of section 22, and approximately two-thirds of the way through section 22 gradually becomes curved in a direction transverse to the longitudinal axis of the bed. Bed section 23 within the blasthead 25 and the portion of section 22 toward the end of the furnace adjacent the blasthead have a uniform transverse curvature the same as that desired of the glass sheets to be manufactured. The plane of the bed is tilted about the longitudinal axis thereof to an angle of about 12° to the horizontal, and hence the left longitudinal edge of the bed, as shown at 26, is lower than the right edge 27. A chain conveyor, illustrated generally by the numeral 28, carrying spaced pairs of glass sheet support feet 29, serves to move the glass sheets over the bed 20 from the loading section 21 through the furnace 24 and throughout the blasthead 25. Gas emitted from perforations in the bed 20 provide a film or cushion of gas on the bed for flotation of the glass sheets thereover. In essence, then, and without attention at this time to important features and details which are more specifically set forth and described in the aforementioned U.S. patent application Serial No. 326,713, the apparatus operates as follows: The glass sheets 30 to be curved and tempered are placed onto the bed at loading section 21 with the bottom edge of each sheet resting on a pair of pads 29 secured to the conveyor chain 28. The glass sheets are conveyed by the chain and float over the bed out of contact therewith by reason of the gas emitted from the perforations in the bed. The floating gas sheets are thus guided through the furnace 24 where they are heated to deformation temperature by the hot gases emitted from the bed perforations; and as they reach the curved portion of section 22, the sheets sag under gravity to conform to the curvature thereof, all the while supported on gas out of contact with the bed. Hence, when the sheets reach the end of the furnace, they are shaped with the full curvature desired. Transportation of the floating heated curved glass sheets then continues through the blasthead 25 where they are tempered by the cooling air projected from the bed perforations in the blasthead.

One of the more serious difficulties with apparatus of the general type described is that of thermal expansion of the bed within the furnace. Since it is undesirable to raise the temperature of the glass sheets too rapidly and since a high rate of production is desired, it will be manifest that the furnace should be of considerable length. In the embodiment shown, the bed within the furnace is about 140 feet long. The furnace operates at a temperature upwards of 1100° F. and as high as 1350° F., and different temperature zones are maintained within the furnace. Initially and after any maintenance shutdown, the furnace must of course, be taken from room temperature up to these operating temperatures; and yet if there is uncompensated thermal expansion of the bed through its 140 foot length, bed distortion will result. This in turn leads to nonuniform glass flotation, poor heat distribution marring of the glass due to contact with the bed, inaccurate glass curvature, and other problems. Of course, one way to minimize the problem of glass contact with the bed is to float the glass rather high off the bed by using considerable gas pressure; however, this is inherently expensive in that higher pressures involve higher costs, and it also has the serious disadvantage of affording less control over the precise curvature imparted to the glass sheets. In the instant system the glass sheets float extremely low over the bed, particularly just prior to and while the glass is curved; and this makes it all the more essential that there be no distortion in the bed as can result from thermal expansion.

The entire bed section 22 is formed of ceramic having an extremely low coefficient of thermal expansion and is preferably of the type illustrated and described in the aforesaid U.S. patent application Serial No. 326,713. Briefly, the bed section 22 in the furnace 24 is formed of blocks 31 which are fused quartz and are manufactured by casting and then heating to sintering temperature, about 2000° F., granular fused quartz. Each of the blocks has a width equal to the width of the bed and a length of about 30 inches. Hence, the entire 140 foot bed section 22 comprises fifty-six of the blocks 31 axially aligned and in abutting relationship. Powdered fused quartz calking is used to fill any crevices between the blocks to thereby seal and cement the blocks together.

Such blocks 31 have so low a coefficient of thermal expansion, about $.54 \times 10^{-6}/°$ C., that the overall linear expansion of the full 140 foot bed in going from room temperature to 1200° F. is less than about 1 inch and the expansion across the width of the bed and through the thickness of the bed is so little as to be negligible. Further, the bed has extremely high heat resistance, erosion resistance, and heat shock resistance and therefore lasts indefinitely with practically no maintenance.

In the particular embodiment shown, the loading section 21 of bed 20 is formed of aluminum sheets; though if desired, it can be made of wood, plastic board or the like. The use of ceramic for the bed section 21 has no advantage and, in fact is disadvantageous because of cost as compared with sheet aluminum or plastic and also because of the greater possibilities of injury to the glass during the loading operation. In the embodiment shown, the bed section 23 in the blasthead 25 is likewise made of aluminum sheets though, as set forth in the aforesaid U.S. patent application, the blasthead bed can be advantageously formed of the same material as the furnace bed.

The general construction of the walls and support frame of the furnace 24 may be as well known to those skilled in the art. For purposes of illustration, the furnace shown in the drawings includes a generally box-like cross section and has sheet metal walls, such as well or floor 120, with insulating material 122 suitably secured thereon. The insulating material 122 may take any convenient form and may be disposed in suitable sections of generally rigid form such as sections 123 and 124 if desired.

Suitably anchored in the ground or other support for the furnace 24 are a series of spaced upright posts 125 for supporting the remainder of the furnace assembly. Secured to uprights 125 are a plurality of spaced angle members 126, extending between opposing posts 125 to support the floor 120 of the furnace. Posts 125 have secured thereto other angle members, such as angle member 127, to support the insulating material or other parts of the furnace. Still other angle members, such as longitudinal angle beam 128, are used for similar purposes.

All of the above-noted structural members may be formed from any suitable metal or other material and of any suitable cross sectional configuration adequate to provide the necessary strength and support for the furnace structure. In accordance with usual furnace construction, these members are generally of steel and hence have a degree of thermal expansion due to the heat within the furnace being conveyed or conducted through the insulating materials 122 and the floor 120 or other walls of the furnace. Although insulating means are provided, it is almost impossible, within reason, to avoid some heat transfer to the structural parts or supports for the furnace; and as a result, these parts will expand.

However, as has been previously pointed out, the ceramic bed 22 has an extremely low coefficient of expansion, and thus the amount of expansion of the bed is very small.

In accordance with the instant invention, to assure against problems due to thermal expansion, or differences in thermal expansion between the bed and the furnace, a series of structural supporting units are mounted exteriorly of the furnace to support the various sections of the bed. The individual units are separated by a suitable amount so as to isolate the expansion within each unit and avoid accumulating the expansion over the length of the furnace. The construction of the support units is such that the amount of thermal expansion in a longitudinal direction is the same as, or at least closely approximates, the amount of thermal expansion of the bed sections within the furnace, taking into account the differences in coefficients of thermal expansion involved.

Figure 2:
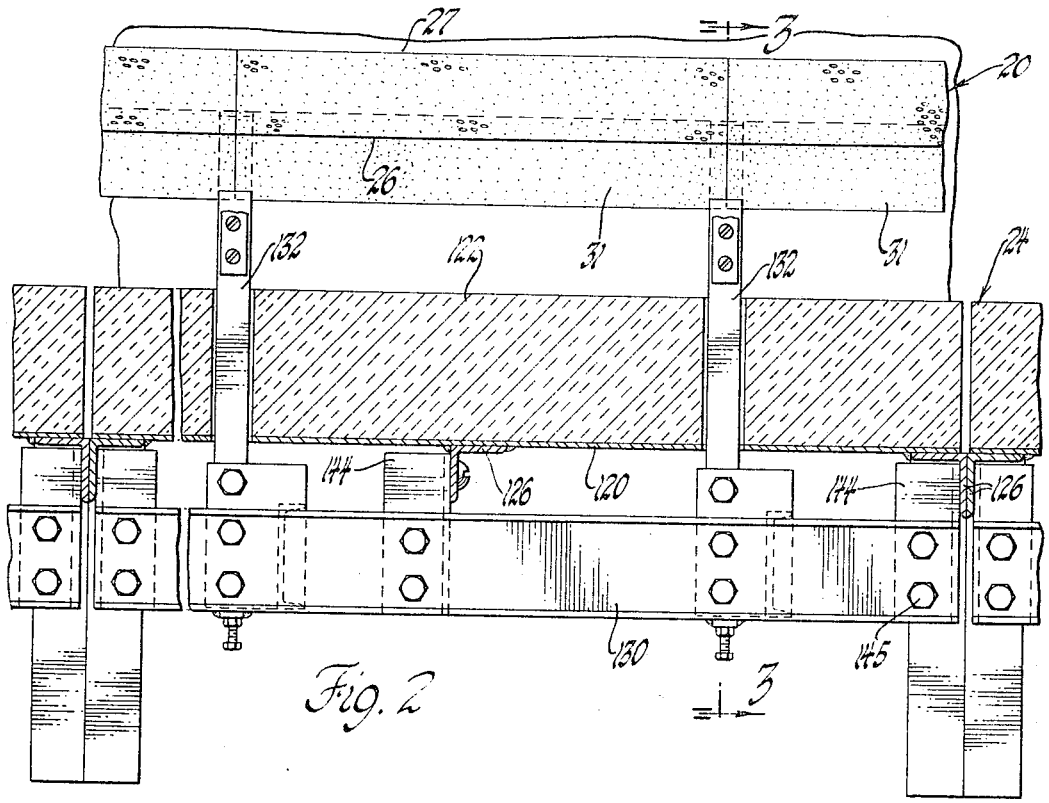
FIGURE 2 is an enlarged elevational view with parts broken away and in section of a portion of the apparatus shown in FIGURE 1 and illustrates the support units for the bed sections within the furnace.
Figure 3:
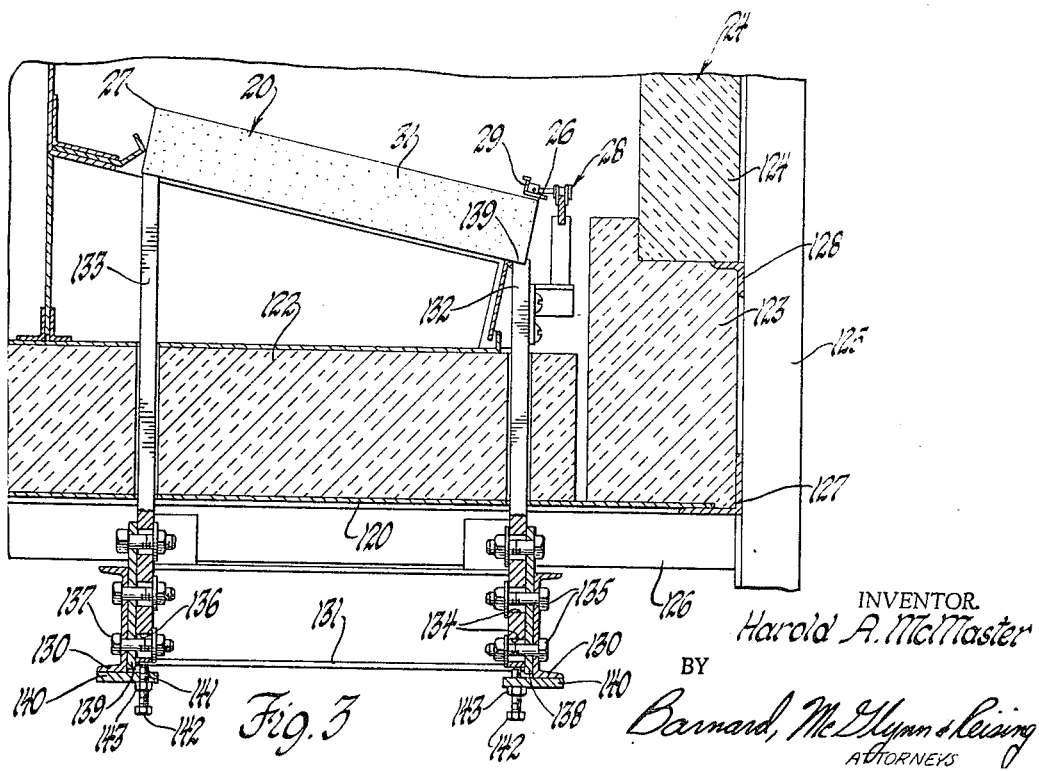
FIGURE 3 is a cross-sectional view of a portion of the furnace illustrated in FIGURES 1 and 2, taken substantially along the line 3—3 of FIGURE 2 and looking in the direction of the arrows.

Referring more particularly to FIGURES 2 and 3, the structure of the support units will now be more particularly described. Extending below, or otherwise exteriorly of the furnace wall of floor 120, are a pair of spaced steel beam members 130 which may take any convenient form and are shown for purposes of illustration as being channel beams. The particular material is unimportant so long as the coefficient of thermal expansion is known and the beam members 130 can supply the proper support for the bed sections 31. Beam members 130 extend a finite length below the furance 24 and in a longitudinal direction.

Extending between the beams 130 and at spaced intervals therealong are cross beams 131, also shown for purposes of illustration as being channel members. The cross beams 131 retain the proper lateral spacing of the beam members 130 and are secured thereto by welding or the like.

Extending upwardly from the beam members 130 are a plurality of posts 132 and 133, spaced at intervals along the beam members 130 a distance equal to the length of the bed sections 31. Support posts 132 are provided with apertures 134 adjacent the lower end thereof to receive bolt and nut fastening devices 135 for securing the posts to the beam 130 as indicated in FIGURE 3. Similarly, posts 133 are provided with apertures 136 to receive nut and bolt fastening devices 137 for securing the posts 133 to the beam members 130. Plate devices 138 and 139 may be provided between the beam members 130 and the posts 132 and 133, respectively, to assure the proper angular relationship or perpendicularity of the posts 132 and 133 relative to the beam members 130.

As shown more particularly in FIGURE 3, the posts 133 are longer than the posts 132 to provide the angular inclination of the bed sections 31 relative to the longitudinal axis of the furnace 24. The upper ends of posts 132 are notched as at 139 to receive the corner of the block section 31 and prevent lateral movement thereof relative to the posts 132 and 133 and the furnace 24.

As best seen in FIGURE 2, the posts 132 and 133 receive the lower corners of adjacent bed sections 31 such that two bed sections rest on each support post 132 and 133. The weight of the bed sections 31 is sufficient to maintain suitable supporting contact between the bed sections 31 and the posts 132 and 133. If desired, additional upstanding bed support posts can be used such that each section 31 is supported, for example, by a post at each end thereof and one or more posts inbetween.

In order to provide adjustment of the bed sections 31 relative to each other and over the length of the bed 20, adjustment means are provided for the posts 132 and 133 relative to the beam members 130. To this end, the apertures 134 and 136 in the posts 132 and 133, respectively, are larger than the shank of the fastening devices 135 and 137 passing therethrough. Secured to the lower flange of beam member 130 are strap members 140, adjacent and below each of the posts 132 and 133. Strap members 140 are provided with threaded apertures 141 which threadedly receive bolt members 142, rotatable to move the posts 132 and 133 upwardly or downwardly within the limits of the oversize apertures 134 and 136. Jam nuts 143 are provided on threaded bolts 142 to maintain the position of the bolts 142 relative to the straps 140 and beam members 130 once the adjustment is made. When the posts 132 and 133 are properly adjusted by means of the bolts 142, the fastening devices 135 and 137 are tightened to their full extent for secure engagement between the various parts.

As has now become apparent, the support means for the bed sections 31 comprise units including beam members 130, cross beams 131, and support posts 132 and 133, as well as other related members, and each of these units is secured to the furnace structure in such a manner that they may be isolated from adjacent units. The beam members 130 have secured thereto suitable angle members 144 which in turn are welded or otherwise secured to the furnace cross beams 126 in some suitable manner. Bolts or the like 145 passing through the beam members 130 and the angle members 144 may be utilized to secure the parts together. Such angle members 144 are provided at the ends of the beam members 130, and should additional support be necessary, such angle members may be secured to intermediate furnace support cross beams as desired.

Each of the units as above described will have some amount of thermal expansion in a longitudinal direction due to the heat passing through the furnace wall. The amount of such longitudinal expansion can be calculated since dimensions and coefficients of expansion are known, and the parameters may be varied so as to provide substantially the same amount of thermal expansion as is found in the bed sections 31 within the furnace 24 as the furnace is brought up to operating heat. The slight amount of lateral or vertical expansion of the block sections is negligible. However, such may be compensated for by the adjustment means at the ends of the posts 132 and 133.

In another modification of the bed support structure, the beam members 130 may be disposed so that each unit comprising a pair of beams 130 is in end to end relation with and spaced from the beam members of adjacent units. The ends of each pair of beam members 130 are separated from the ends of adjacent pairs of beam members 130 in the adjoining units by an amount sufficient to prevent abutment of the ends of the beam members upon thermal expansion thereof to avoid the accumulation of thermal expansion along all of the abutting beam members 130.

Each pair of beam members 130 will normally expand the same amount as that portion of the bed supported thereby, but each pair of beam members 130 may be spaced from adjacent units so that in the event the operating temperature is such to cause the beam members to expand greater than the bed, each portion of the bed will only be effected by the very slight over-expansion of the pair of beam members 130 supporting that particular bed portion instead of the bed being subjected to an accumulated over-expansion of the entire length of the bed support structure.

Thus, there is provided a means for supporting a bed within a furnace which avoids or prevents distortion and other problems due to differences in expansion characteristics between the bed and the furnace. The support units are relatively simple in construction, manufacture, and assembly yet are excellent in their support of the bed sections, the support expanding substantially the same amount as the bed it supports. Thus, misalignment and other problems in the bed itself, caused by expansion and contraction due to heat generated in the furnace, is avoided by properly supporting the sections in a manner as above described.

While the invention has been described in detail with reference to only a single embodiment thereof, it will be apparent that various other embodiments can be used and that modifications and alterations may be made all within the scope of the claims which follow.

I claim:

1. A support unit for a bed formed of a plurality of sections disposed in end to end aligned relation and extending through a furnace having walls, said support unit comprising: a pair of beam members extending longitudinally of said furnace and along a portion of the length thereof, said beam members being laterally spaced a distance substantially the same as the width of said bed sections and being of a predetermined length, and said beam members being disposed exteriorly of said furnace and subjected only to the heat conveyed through said walls; a plurality of cross beams at spaced intervals along the length of said beam members and extending therebetween and secured thereto; a plurality of posts extending from each of said beam members at longitudinally spaced intervals and extending through one of said walls of said furnace, said posts being adapted to engage said bed sections, said posts extending from one of said beam members being longer than the posts extending from the other of said beam members to tilt said bed sections relative to the longitudinal axis of said furnace, the shorter of said posts having notched bed engaging ends to prevent lateral movement of said bed sections; and means for securing said unit to the structural support for said furnace; said unit having an amount of thermal expansion in a direction longitudinally of said furnace equal to the amount of thermal expansion in the same direction of the bed sections supported thereby.

2. The support unit set forth in claim 1 wherein a plurality of said units are disposed in longitudinal end to end relation.

3. A furnace comprising: a furnace housing, a heat source disposed within said housing, housing support means for supporting said housing, a bed in said housing, said bed having a thermal expansion different from that of said housing, said bed including means to supply hot gas to the upper surface thereof to support and heat a sheet thereover, bed support means independent of said housing and said housing support means and disposed out of the heat zone created by said heat source, means having negligible thermal expansion longitudinally of said bed and extending through said housing to interconnect said bed and said bed support means, said bed support means having a higher coefficient of thermal expansion than said bed so that said bed support means has substantially the same amount of thermal expansion as said bed during operation of said furnace due to the isolation thereof from said heat source.

4. An elongated furnace comprising: an elongated bed positioned within said furnace, means for supporting said furnace, spaced parallel beam members extending longitudinally of said furnace, said beam members being disposed exteriorly of said furnace, posts secured at spaced intervals along said respective beam members and extending into said furnace, said posts engaging said bed for supporting said bed, the difference in the thermal expansion between said bed and said beams being compensated for by the disposition of said beams exteriorly of said furnace, and said posts disposed substantially perpendicular to the longitudinal axis of said furnace whereby the thermal expansion thereof longitudinally of said furnace is negligible.

5. A furnace as set forth in claim 4 wherein said posts are adjustably mounted on said beam members for adjustment of the position of said bed within said furnace.

6. An elongated furnace comprising: a housing, housing support means for supporting said housing, an elongated bed disposed within said housing, a plurality of pairs of parallel beams disposed exteriorly of said housing and parallel therewith, each pair of said beams disposed in end to end relationship with adjacent pairs of said beams, a plurality of posts extending upwardly from each pair of said beams to support a portion of said bed, said beams having a relatively high coefficient of thermal expansion and said bed having a lower coefficient of thermal expansion, said beams being sufficiently isolated from said housing that the thermal expansion of each beam is substantially equal to the thermal expansion of the length of said bed supported thereby.

7. A furnace as set forth in claim 6 including means interconnecting said beams and said housing support means.

8. A furnace as set forth in claim 6 wherein said posts are adjustably mounted on said beams for adjustment of said bed relative to said furnace.

9. A furnace as set forth in claim 6 wherein said posts extending from one beam of each of said pairs are longer than said posts extending from the other beam of each of said pairs to tilt said bed relative to said furnace about the longitudinal axis thereof.

10. A furnace comprising: a housing, support means for supporting said housing, an elongated bed disposed within said housing, a bed support structure extending longitudinally of and exteriorly of said housing, said bed support structure including a plurality of independent units, and means extending through said housing for interconnecting each of said units and said bed so that each of said units supports a portion of said bed, said bed being of material having a lower coefficient of thermal expansion than said units and said units being independent and disposed exteriorly of said housing to substantially compensate for the difference in the coefficients of thermal expansion of said bed and said units.

11. A furnace comprising: a housing, support means for supporting said housing, an elongated bed in said housing, said bed being exposed to a relatively high temperature source, a bed support structure extending longitudinally of said housing and exposed to a relatively lower temperature, and means for interconnecting said bed and said support structure, said bed support structure being of a material having a total thermal expansion for the length thereof substantially equal to the total thermal expansion of the material of said bed for the length thereof supported by said support structure when said furnace is raised to operating temperature so that there is substantially no relative movement between said bed and said bed support structure in a direction longitudinally thereof when said furnace is raised to operating temperature.

12. A furnace comprising: a housing, support means for supporting said housing, an elongated bed in said housing, a bed support structure extending longitudinaly of said housing, means having a negligible amount of thermal expansion in a direction longitudinally of said furnace for interconnecting said bed and said bed support structure, and means for heating the interior of said furnace, said bed being formed of a material having a relatively low coefficient of thermal expansion, said bed support structure having a relatively high coefficient of thermal expansion, said bed support structure being sufficiently isolated from the heat of said furnace that the thermal expansion thereof is substantially equal to the thermal expansion of said bed.

13. A furnace as set forth in claim 12 wherein said means for interconnecting said bed and said bed support structure includes a plurality of spaced posts extending through said housing and having a width along the longitudinal axis of said furnace which is insufficient to produce an adverse degree of thermal expansion thereof in a direction parallel to the longitudinal axis of said furnace.

References Cited by the Examiner

UNITED STATES PATENTS 3,140,164  7/1964  Long _____ 65—374 XR

DONALL H. SYLVESTER, *Primary Examiner.*

S. LEON BASHORE, A. D. KELLOGG,

*Assistant Examiners.*